(12) United States Patent
Maruyama et al.

(10) Patent No.: US 9,937,645 B2
(45) Date of Patent: Apr. 10, 2018

(54) INJECTION MOLDING MACHINE HAVING TIE-BAR BALANCE ADJUSTMENT FUNCTION

(71) Applicant: FANUC CORPORATION, Minamitsuru-gun, Yamanashi (JP)

(72) Inventors: Junpei Maruyama, Yamanashi (JP); Koichi Nishimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 559 days.

(21) Appl. No.: 14/063,875

(22) Filed: Oct. 25, 2013

(65) Prior Publication Data
US 2014/0120193 A1 May 1, 2014

(30) Foreign Application Priority Data
Oct. 26, 2012 (JP) .................... 2012-237096

(51) Int. Cl.
*B29C 45/80* (2006.01)
*B29C 45/17* (2006.01)

(52) U.S. Cl.
CPC .......... *B29C 45/1751* (2013.01); *B29C 45/80* (2013.01)

(58) Field of Classification Search
CPC ............................ B29C 45/1751; B29C 45/80
USPC ....................................................... 425/150
See application file for complete search history.

(56) References Cited

U.S. PATENT DOCUMENTS

| 3,191,235 A * | 6/1965 | Rougement ............ B29C 45/68 425/152 |
| 6,050,804 A | 4/2000 | Tamaki et al. |
| 6,561,785 B1 | 5/2003 | Morita et al. |
| 2002/0014720 A1 * | 2/2002 | Sicilia et al. ................. 264/255 |
| 2005/0244537 A1 | 11/2005 | Uchiyama et al. |
| 2010/0227014 A1 | 9/2010 | Kato et al. |

FOREIGN PATENT DOCUMENTS

| AT | 395556 B | 1/1993 |
| CN | 1689787 A | 11/2005 |
| CN | 101873914 A | 10/2010 |
| DE | 102006016343 A1 | 10/2007 |
| JP | 08-258102 A | 10/1996 |
| JP | 8-258102 A | 10/1996 |
| JP | 11-077776 A | 3/1999 |
| JP | 11-77776 A | 3/1999 |

(Continued)

OTHER PUBLICATIONS

Certified English Translation of DE 102006016343 (filed Apr. 5, 2006, published Oct. 11, 2017 and translated Jul. 2017).*

(Continued)

*Primary Examiner* — Robert J Grun
(74) *Attorney, Agent, or Firm* — Hauptman Ham, LLP

(57) ABSTRACT

An injection molding machine has a die-height adjustment system. External screws formed individually on four tie-bars and die-height adjusting nuts threadedly engaged therewith are configured to be rotated independently with one another. In processes prior to mold clamping, the die-height adjusting nuts are rotated so that movable and stationary platen surfaces maintain a desired parallelism. During mold clamping, the die-height adjusting nuts are rotated so that clamping forces produced by the tie-bars are in a desired balance.

3 Claims, 4 Drawing Sheets

(56) References Cited

FOREIGN PATENT DOCUMENTS

| | | |
|---|---|---|
| JP | 11-227014 A | 8/1999 |
| JP | 2000-313040 A | 11/2000 |
| JP | 3517774 B2 | 4/2004 |
| JP | 2010-69869 A | 4/2010 |
| JP | 2014-233955 A | 12/2014 |

OTHER PUBLICATIONS

Notification of decision to grant a patent mailed Oct. 7, 2014, corresponding to Japanese patent application No. 2012-237096.
Office Action dated Oct. 9, 2015, corresponding to German Patent Application No. 102013017358.2.

* cited by examiner

INJECTION MOLDING MACHINE HAVING TIE-BAR BALANCE ADJUSTMENT FUNCTION

RELATED APPLICATIONS

The present application is based on and claims priority to Japanese Application Number 2012-237096, filed Oct. 26, 2012, the disclosure of which is hereby incorporated by reference herein in its entirety.

BACKGROUND OF THE INVENTION

1. Field of the Invention

The present invention relates to an injection molding machine having a tie-bar balance adjustment function.

2. Description of the Related Art

In closing a mold assembly for injection molding, mold surfaces (surfaces of stationary and movable molds) should preferably be brought into close contact with each other while maintaining a good parallelism between them, in order to improve the shape accuracy of molded articles. To attain this, a technique is proposed in which mold closing is performed while maintaining a good parallelism of movable and stationary platens of an injection molding machine. In producing clamping forces in the mold assembly by mold clamping, moreover, uniform surface pressures should preferably be applied to the mold surfaces to maintain satisfactory shape accuracy of molded articles and prevent generation of burrs. To this end, a technique is proposed in which a mold clamping unit is adjusted to equalize clamping forces produced by its four tie-bars.

Japanese Patent Application Laid-Open No. 11-77776 discloses a technique for maintaining parallelism of stationary and movable plates. According to this technique, one end of a screw shaft for actuating a toggle mechanism and nut gears for mold thickness adjustment, configured to be threadedly engaged with screw portions of tie-bars, are made to mesh with one another by bevel gears and connected by transmission means capable of being connected and disconnected by a clutch mechanism. In this arrangement, mold thickness adjustment is achieved by alternatively engaging or disengaging the clutch mechanism to rotate the nut gears independently of one another.

Japanese Patent Application Laid-Open No. 8-258102 discloses a technique for maintaining balance between clamping reaction forces that act on tie-bars. According to this technique, die-height adjusting nuts are arranged so that they can rotate independently of one another, and detection means is provided to detect tensions individually acting on the tie-bars or elongations of the tie-bars. In this arrangement, the die-height adjusting nuts are rotated so that the tensions on the tie-bars or the elongations of the tie-bars are equal during mold clamping.

If the mold clamping unit is adjusted so that the clamping forces produced individually by its four tie-bars during mold clamping are equal, however, the parallelism of movable and stationary platen surfaces of the movable and stationary platens may not always be satisfactory when the mold assembly is open. Movable and stationary molds are mounted on the sides of the movable and stationary platen surfaces, respectively.

The clamping forces produced by the tie-bars during mold clamping can be equalized by only adjusting the respective effective lengths of the tie-bars (i.e., lengths from tie-bar fixing portions on the side of a rear platen to those on the stationary-platen side) to be equal. Since the rear and stationary platens are connected by the tie-bars with the equal effective lengths, in this case, the rear and stationary platens are kept parallel to each other. In some cases, however, the parallelism of the movable and stationary platen surfaces of the movable and stationary platens that are connected by a power transmission system, such as toggle links, may not always be satisfactory. This is because the movable platen is tilted relative to the rear platen, since there are gaps for sliding at junctions between components of the toggle links and gravity acts on the toggle link components.

To adjust the movable and stationary platens to be parallel to each other in a state where the mold assembly is open, therefore, the respective effective lengths of the tie-bars are adjusted to correct the tilt of the movable platen. There is a problem, however, that the clamping forces produced by the tie-bars cannot be equal if mold clamping is performed in this adjusted state.

Thus, according to the conventional techniques, it is difficult to reconcile maintenance of the parallelism of mold surfaces in a state where the mold assembly is open with production of uniform clamping forces during mold clamping.

Normally, in an adjustment process during machine production, moreover, either the parallelism of mold surfaces or the uniformity of the clamping forces is preferentially adjusted, and readjustment after shipment would require a large-scale adjustment work.

Thus, regardless of whether the parallelism of mold surfaces or the uniformity of the clamping forces affects the quality of molded article, molding is generally performed in a state that has been adjusted at the time of factory shipment, without readjusting the mold clamping unit.

SUMMARY OF THE INVENTION

Accordingly, in view of the above-described problems of the prior art, the object of the present invention is to provide an injection molding machine having a tie-bar balance adjustment function capable of reconciling maintenance of the parallelism of mold surfaces in a state where a mold assembly is open with production of uniform clamping forces during mold clamping.

A first embodiment of an injection molding machine according to the present invention has a die-height adjustment system, wherein an end portion of each of tie-bars, on which an external screw is formed, is threadedly engaged with each corresponding one of die-height adjusting nuts which are rotatably and axially immovably attached to four corners of a rear platen, and the die-height adjustment system is configured to adjust a clearance between a stationary platen and the rear platen by rotating the die-height adjusting nuts to change effective lengths of tie-bars. At least two of the die-height adjusting nuts are configured to rotate independently of each other. The injection molding machine comprises a die-height controller configured to independently change the effective lengths of the tie-bars. The die-height controller is configured to rotate the die-height adjusting nuts at an arbitrary point in time during a period from a time point when clamping forces in a preceding molding cycle are released until close contact between mold surfaces in a present molding cycle so that a movable platen surface and a stationary platen surface maintain a desired parallelism, and to rotate the die-height adjusting nuts at an arbitrary point in time during a period from the close contact between the mold surfaces until the start of the mold clamping so that a clamping force produced by each of the tie-bars during mold clamping is in a desired balance.

A second embodiment of an injection molding machine according to the present invention has a die-height adjustment system, wherein an end portion of each of tie-bars, on which an external screw is formed, is threadedly engaged with each corresponding one of die-height adjusting nuts which are rotatably and axially immovably attached to four corners of a rear platen, and the die-height adjustment system is configured to adjust a clearance between a stationary platen and the rear platen by rotating the die-height adjusting nuts to change effective lengths of tie-bars. At least two of the die-height adjusting nuts are configured to rotate independently of each other. The injection molding machine comprises a die-height controller configured to independently change the effective lengths of the tie-bars. The die-height controller has two modes including a mode where maintenance of a desired parallelism of a movable platen surface and a stationary platen surface is regarded as preferential and a mode where achievement of a desired balance between clamping forces produced by the tie-bars during mold clamping is regarded as preferential. The die-height controller is configured to rotate the die-height adjusting nuts so that a movable platen surface and a stationary platen surface maintain a desired parallelism or that a clamping force produced by each of the tie-bars during mold clamping is in a desired balance, depending on selection between the two modes.

Each of the first and second embodiment of the injection molding machine may further comprise: a position detection section for the die-height adjusting nuts; and a storage unit in which positions of the die-height adjusting nuts at which the movable and stationary platen surfaces maintain the desired parallelism and positions of the die-height adjusting nuts at which the clamping force produced by each of the tie-bars during mold clamping is in the desired balance are stored in advance, wherein the die-height controller moves the die-height adjusting nuts to the positions stored in the storage unit.

Each of the first and second embodiment of the injection molding machine may further comprise: a detection section of relative movements of the die-height adjusting nuts; and a storage unit in which amounts of relative movements of positions of the die-height adjusting nuts at which the movable and stationary platen surfaces maintain the desired parallelism and positions of the die-height adjusting nuts at which the clamping force produced by each of the tie-bars during mold clamping is in the desired balance are stored in advance, wherein the die-height controller moves the die-height adjusting nuts by the amounts of relative movements stored in the storage unit.

Each of the first and second embodiment of the injection molding machine may further comprise: a position detection section for the die-height adjusting nuts; a storage unit in which positions of the die-height adjusting nuts at which the clamping force produced by each of the tie-bars during mold clamping is in the desired balance are stored in advance; and a parallelism detection section configured to detect parallelism of the movable and stationary platen surfaces or of a movable mold surface and a stationary mold surface, wherein the die-height controller rotates the die-height adjusting nuts based on the parallelism detected by the parallelism detection section so that the movable and stationary platen surfaces maintain the desired parallelism and moves the die-height adjusting nuts to the positions stored in the storage unit so that the clamping force produced by each of the tie-bars during mold clamping is in the desired balance.

Each of the first and second embodiment of the injection molding machine may further comprise: a position detection section for the die-height adjusting nuts; a storage unit in which amounts of relative movements of positions of the die-height adjusting nuts at which the movable and stationary platen surfaces maintain the desired parallelism are stored in advance; and clamping force detection sections configured to individually detect clamping forces produced by at least two of the tie-bars, wherein the die-height controller moves the die-height adjusting nuts to the positions stored in the storage unit so that the movable and stationary platen surfaces maintain the desired parallelism and moves the die-height adjusting nuts based on the clamping forces detected by the clamping force detection sections so that the clamping force produced by each of the tie-bars during mold clamping is in the desired balance.

Each of the first and second embodiment of the injection molding machine may further comprise: a parallelism detection section configured to detect parallelism of the movable and stationary platen surfaces or of a movable mold surface and a stationary mold surface; and clamping force detection sections configured to individually detect clamping forces produced by at least two of the tie-bars, wherein the die-height controller rotates the die-height adjusting nuts based on the parallelism detected by the parallelism detection section so that the movable and stationary platen surfaces maintain the desired parallelism and moves the die-height adjusting nuts based on the clamping forces detected by the clamping force detection sections so that the clamping force produced by each of the tie-bars during mold clamping is in the desired balance.

According to the present invention, there can be provided an injection molding machine having a tie-bar balance adjustment function capable of reconciling maintenance of the parallelism of mold surfaces in a state where a mold assembly is open with production of uniform clamping forces during mold clamping.

According to the first embodiment of the invention, maintenance of the parallelism of the mold surfaces in a state where a mold assembly is open can be reconciled with production of the uniform clamping forces during mold clamping, so that the effects of improvement of the shape accuracy of molded articles, suppression of burrs, etc., can be obtained at a time.

According to the second embodiment of the invention, moreover, a mold clamping unit can be adjusted based on a selected order of priority between the parallelism of the movable and stationary platen surfaces and the uniformity of the clamping forces, so that preferential characteristics selected from the shape accuracy of molded articles, suppression of burrs, etc., can be improved depending on the properties of the molded articles.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
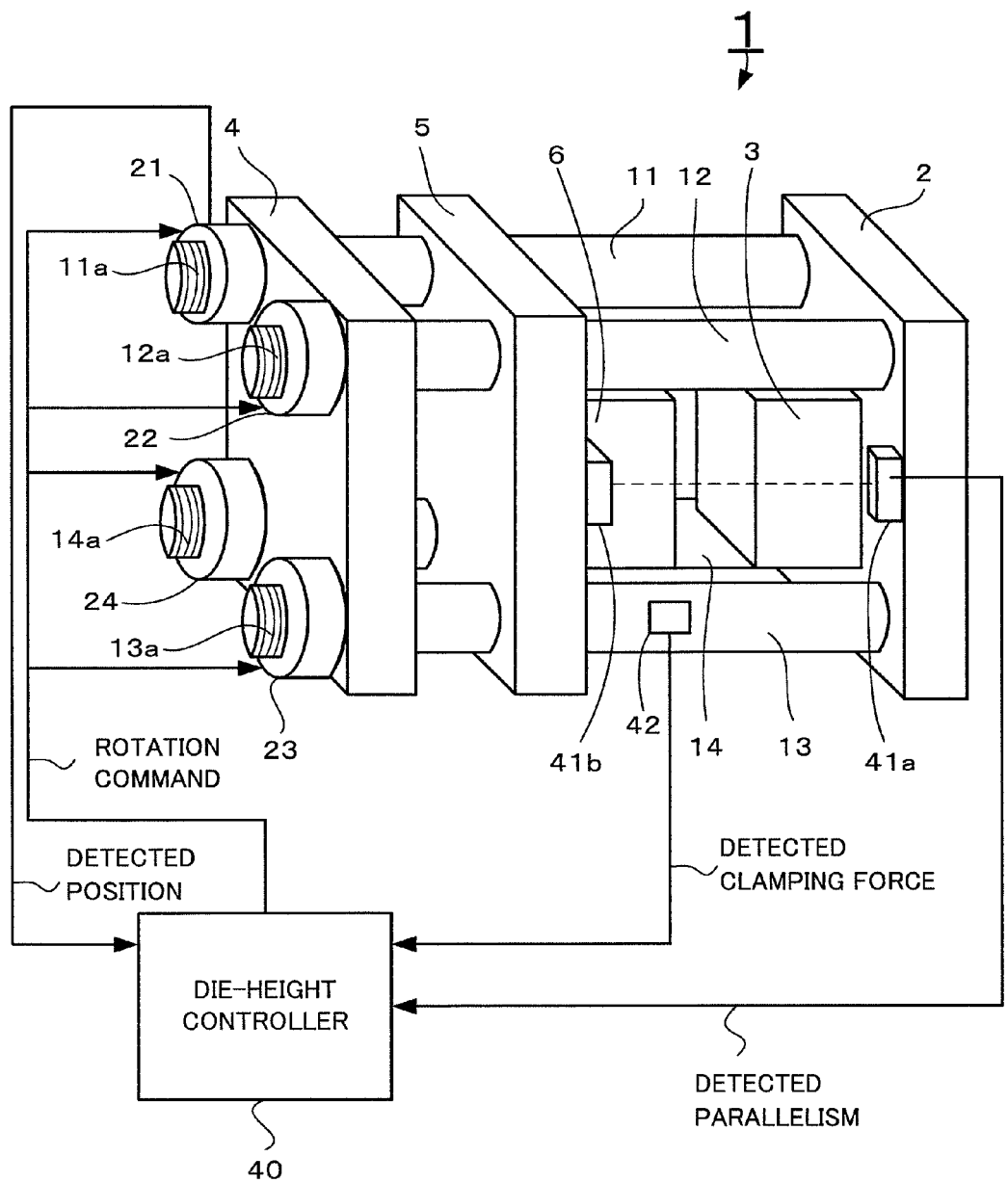
FIG. 1 is a diagram illustrating a schematic configuration of a mold clamping unit of an injection molding machine according to the present invention.
Figure 2:
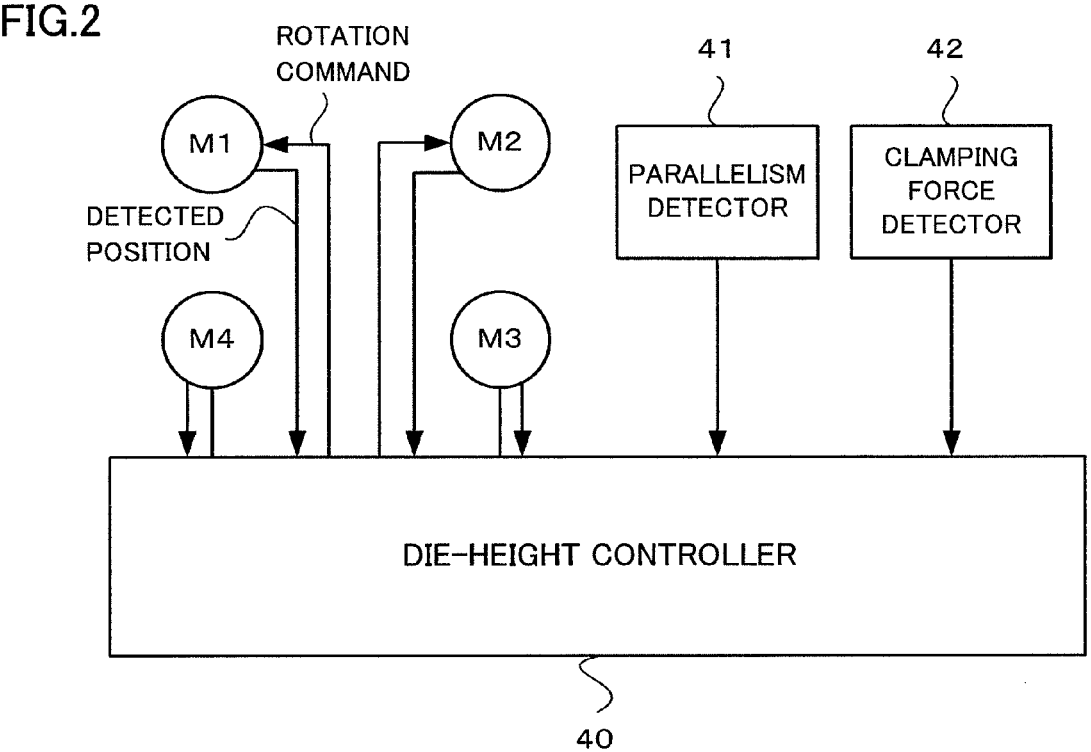
FIG. 2 is a diagram illustrating control by a die-height controller of the injection molding machine of FIG. 1.
Figure 3:
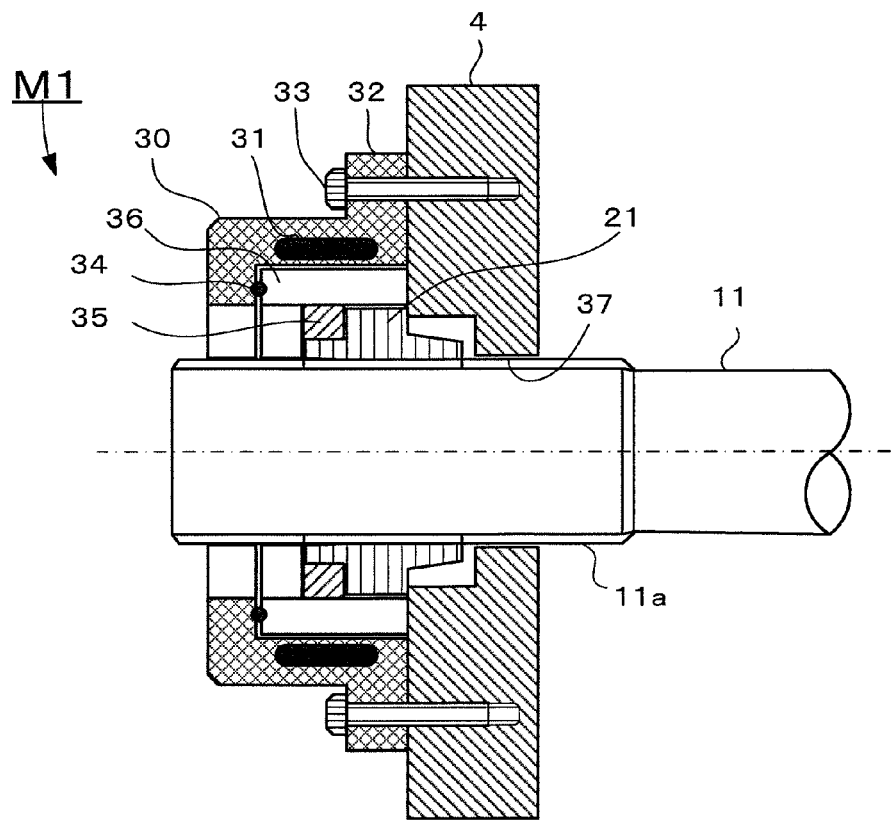
FIG. 3 is a sectional view schematically showing a die-height adjusting nut that constitutes a die-height adjustment system of the injection molding machine of FIG. 1 and its surroundings.

An injection molding machine comprises an injection unit and a mold clamping unit on a machine base. Since the injection molding machine of the present invention has a tie-bar balance adjustment function, the mold clamping unit will primarily be described, and a description of the injection unit and the machine base will be omitted. FIG. 1 is a diagram illustrating a schematic configuration of the mold clamping unit of the injection molding machine. FIG. 2 is a diagram illustrating a die-height controller. FIG. 3 is a sectional view schematically showing a die-height adjusting nut of a die-height adjustment system and its surroundings.

In FIG. 1, numeral 1 denotes the mold clamping unit. A rear platen 4 is located opposite a stationary platen 2, which is fitted with a stationary mold 3, with four tie-bars 11, 12, 13 and 14 between them. Further, a movable platen 5 fitted with a movable mold 6 is disposed for advance or retreat between the stationary and rear platens 2 and 4. A toggle mechanism (not shown) is provided between the movable and rear platens 5 and 4. The toggle mechanism is driven for mold opening/closing operation by a servomotor (not shown) attached to, for example, the rear platen 4.

External screws 11a, 12a, 13a and 14a are formed on the end portions of the four tie-bars 11 to 14 that penetrate the four corners of the rear platen 4, respectively. Die-height adjusting nuts 21, 22, 23 and 24 are threadedly engaged with the external screws 11a, 12a, 13a and 14a, respectively. By rotating the die-height adjusting nuts 21 to 24, the respective effective lengths of the tie-bars 11 to 14 can be changed to adjust the clearance (effective tie-bar length) between the stationary and rear platens 2 and 4.

The die-height adjusting nuts 21 to 24 that are threadedly engaged with the external screws 11a to 14a of the tie-bars 11 to 14 are independently rotated by motors M1, M2, M3 and M4, respectively. A die-height controller 40 drivingly controls the motors M1 to M4 based on rotation commands in an independent manner. The motors M1 to M4 individually have therein rotational position detectors (not shown) for detecting their rotational positions. Signals indicative of the rotational positions detected by these rotational position detectors are fed back to the die-height controller 40. The rotational positions detected by the rotational position detectors individually represent the respective positions of the die-height adjusting nuts 21 to 24. The rotational positions of the die-height adjusting nuts 21 to 24 may be detected in place of those of the motors M1 to M4. The die-height controller 40 is connected with various sensors (parallelism detector 41 (41a and 41b), clamping force detector 42, etc.) and receives signals (signals of detected parallelisms, detected clamping forces, etc.) from these sensors.

The die-height controller 40 can be realized as a function of a controller of the injection molding machine.

<Adjustment Means for Effective Tie-Bar Length>

FIG. 3 is a sectional view schematically showing one of the die-height adjusting nuts of the die-height adjustment system and its surroundings. Since the means for adjusting the respective effective lengths of the tie-bars 11 to 14 are constructed in the same manner, the die-height adjusting nut 21 that is threadedly engaged with the tie-bar 11 will be described as a representative example.

Holes are formed at the four corners of the rear platen 4, and the die-height adjusting nut 21 is rotatably and axially immovably attached to one (denoted by numeral 37) of those holes. An end portion of the tie-bar 11, on which the external screw 11a is formed, is threadedly engaged with the die-height adjusting nut 21. The die-height adjusting nut 21 is non-rotatably and axially immovably secured to the inner peripheral surface of a rotor 36 of the motor M1 by a friction fastening element 35. This die-height adjusting nut 21 is rotated integrally with the rotor 36 by excitation of a coil (stator coil) 31 fixedly disposed on the side of a motor housing 30 that constitutes a stator. Numeral 34 denotes a bearing. Further, an annular flange portion 32 is formed on the outer peripheral portion of the motor housing 30, and the motor M1 is secured to the reverse side of the rear platen 4 by a plurality of bolts 33 passed through the annular flange portion 32.

As described above, the die-height adjusting nut 21 is rotated by the motor M1 for rotary drive. By rotating the die-height adjusting nut 21, the effective length of the tie-bar 11 is changed to adjust the clearance (effective length) between the stationary and rear platens 2 and 4. If the adjusting nut 21 moves toward the stationary platen 2 (from left to right in FIG. 3), the effective length decreases. If the adjusting nut 21 moves away from the stationary platen 2 (from right to left in FIG. 3), the effective length increases.

The die-height adjusting nuts 21 to 24 are configured to rotate independently of one another. For example, the die-height adjusting nut 21 is driven by the motor M1. Likewise, the die-height adjusting nuts 22, 23 and 24 are provided with the motors M2, M3 and M4 for rotary drive (not shown), respectively, so that the die-height adjusting nuts 21 to 24 can be controlled independently of one another. As described in Japanese Patent Application Laid-Open No. 8-258102, the drive control of the die-height adjusting nuts by means of the driving force of motors is a conventional technique.

The effective length adjusting means for the tie-bars is not limited to the configuration described above. As an alternative example of the effective length adjusting means, the die-height adjusting nuts 21 to 24 may be connected by transmission means capable of being connected and disconnected by a clutch mechanism (not shown). In this case, the die-height adjusting nuts 21 to 24 can be drivingly controlled so as to be independently rotatable and axially immovable by alternatively engaging or disengaging the clutch mechanism.

In the example described above, the die-height adjusting nut is secured to the inner peripheral surface of the rotor of the motor M1. Alternatively, however, the die-height adjusting nut may be drivingly controlled by connecting the motor M1 and the die-height adjusting nut by means of a power transmission system, such as a chain and gears.

In the arrangement described above, the die-height adjusting nuts 21 to 24 are independently position-controlled. However, the present invention can also be applied in a case where at least two of the die-height adjusting nuts are configured to be independently position-controlled.

<Mold Clamping Mechanism>

A joint between the rear and movable platens 4 and 5 may be configured so that the driving force of a motor or oil pressure is amplified by a power amplification system, such as a toggle link or crank, as it is transmitted. Alternatively, the driving force of a motor or oil pressure may be directly transmitted by a ball screw or oil hydraulic cylinder.

The following is a description of embodiments of the present invention using the above-described configuration of the injection molding machine.

First Embodiment

A first embodiment of the present invention is intended to reconcile maintenance of the parallelism of mold surfaces in a state where the mold assembly is open with production of uniform clamping forces during mold clamping. The following is a detailed description of operation sequences.

(1) The respective effective lengths of the tie-bars are adjusted so that the mold surfaces are parallel in a state where the mold assembly (movable and stationary platens) is open.

(2) The mold surfaces are brought into close contact in a mold closing process (with no clamping force produced yet).

(3) The respective effective lengths of the tie-bars are adjusted so that the clamping forces produced by the tie-bars during mold clamping are equal with the mold surfaces kept in close contact.

(4) Clamping forces are produced by mold clamping.

(5) A series of processes, including injection, dwelling, and metering, is performed to form a molded article in the mold assembly.

(6) The mold clamping is released with the mold surfaces kept in close contact in a mold opening process.

(7) The respective effective lengths of the tie-bars are adjusted so that the mold surfaces are kept parallel while in close contact.

(8) The molded article is removed from the mold assembly by mold opening and ejection.

According to the first embodiment of the present invention, maintenance of the parallelism of the mold surfaces in a state where the mold assembly is open can be reconciled with production of the uniform clamping forces during mold clamping, so that the effects of improvement of the shape accuracy of molded articles, suppression of burrs, etc., can be obtained at a time.

Figure 4:
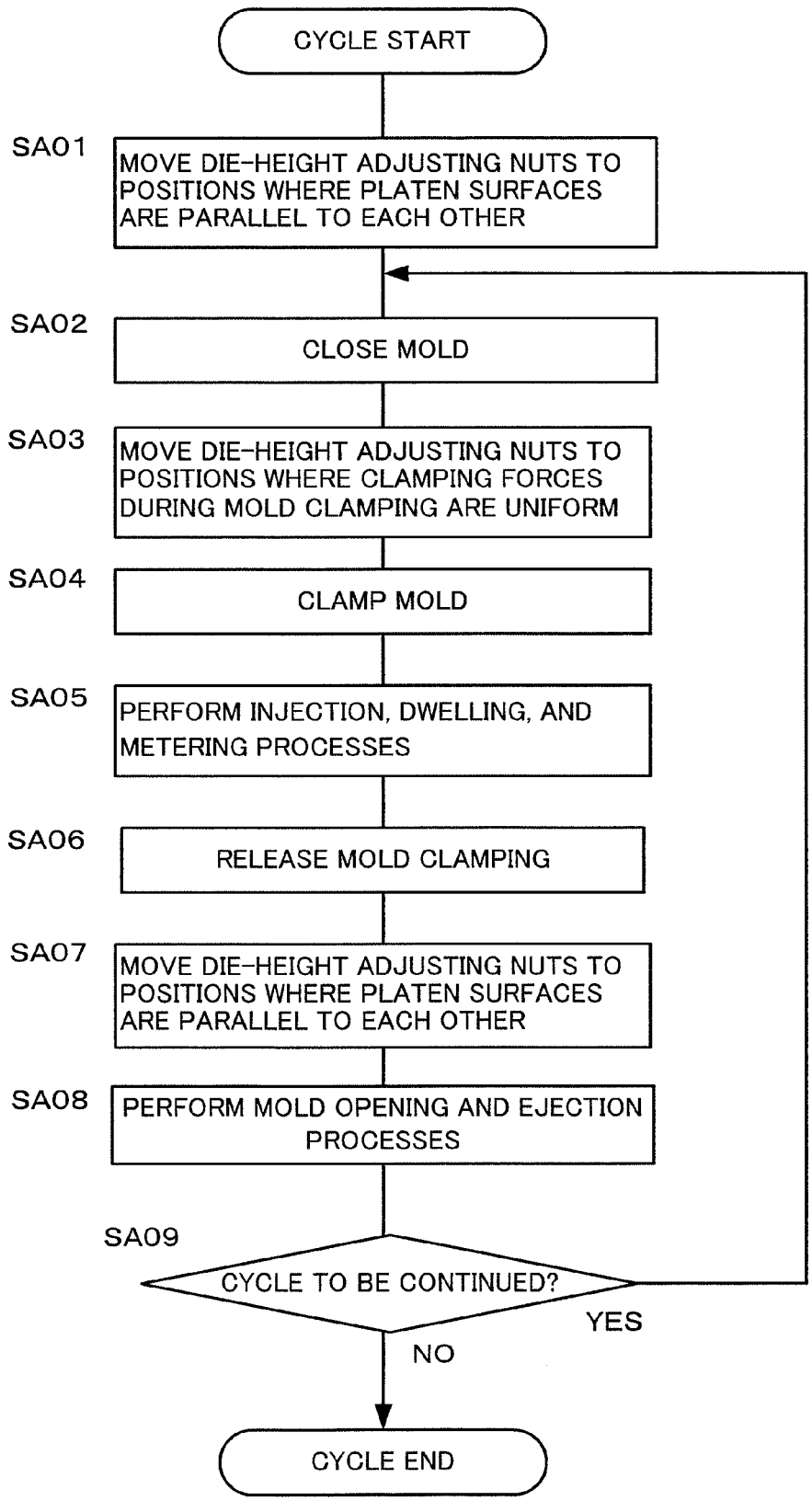
FIG. 4 is a flowchart illustrating a flow of processing in the first embodiment of the injection molding machine according to the present invention.

FIG. 4 is a flowchart illustrating a flow of processing in the first embodiment of the injection molding machine according to the present invention corresponding to the operation sequences described above. The following is a sequential description of various steps of operation.

[Step SA01] The die-height adjusting nuts are moved to positions where the surfaces of the movable and stationary platens are parallel.

[Step SA02] The mold closing process is performed.

[Step SA03] The die-height adjusting nuts are moved to positions where the clamping forces during mold clamping are uniform.

[Step SA04] The mold closing process is performed.

[Step SA05] The injection, dwelling, and metering processes are performed.

[Step SA06] The mold clamping is released.

[Step SA07] The die-height adjusting nuts are moved to the positions where the movable and stationary platen surfaces are parallel.

[Step SA08] The mold opening and ejection processes are performed.

[Step SA09] It is determined whether or not to continue the cycle. If the cycle is to be continued (YES), the program returns to Step SA02. If not (NO), this processing ends.

Second Embodiment

A second embodiment of the present invention is intended to adjust the mold clamping unit based on the selected order of priority between the parallelism of the movable and stationary platen surfaces and the uniformity of the clamping forces.

(1) The parallelism of the movable and stationary platen surfaces or the uniformity of the clamping forces is selected as a preferential factor.

(2) If a mode where the parallelism of the movable and stationary platen surfaces is regarded as preferential is selected, the respective effective lengths of the tie-bars are adjusted so that the mold surfaces are kept parallel. If a mode where the uniformity of the clamping forces during mold closing is regarded as preferential is selected, the respective effective lengths of the tie-bars are adjusted so that the clamping forces produced by the tie-bars are equal.

(3) Molding operation is performed in the selected mode.

In the second embodiment, in contrast with the first embodiment in which the positions of the die-height adjusting nuts are moved during a molding cycle, the mold clamping unit is adjusted based on the previously selected order of priority between the parallelism of the movable and stationary platen surfaces and the uniformity of the clamping forces, depending on the properties of molded articles. If the parallelism of the movable and stationary platen surfaces affects the shape accuracy of molded articles, as in the case of optical lenses, for example, the mode where it is regarded as preferential is selected.

In the case of a molded article that is susceptible to burrs during resin filling at high pressure, e.g., a thin-walled one, molding operation is performed after the respective positions of the die-height adjusting nuts are moved based on the previously selected mode where the uniformity of the clamping forces is regarded as preferential.

According to the second embodiment of the present invention, the mold clamping unit can be adjusted based on the selected order of priority between the parallelism of the movable and stationary platen surfaces and the uniformity of the clamping forces, so that preferential characteristics selected from the shape accuracy of molded articles, suppression of burrs, etc., can be alternatively improved depending on the properties of the molded articles.

Figure 5:
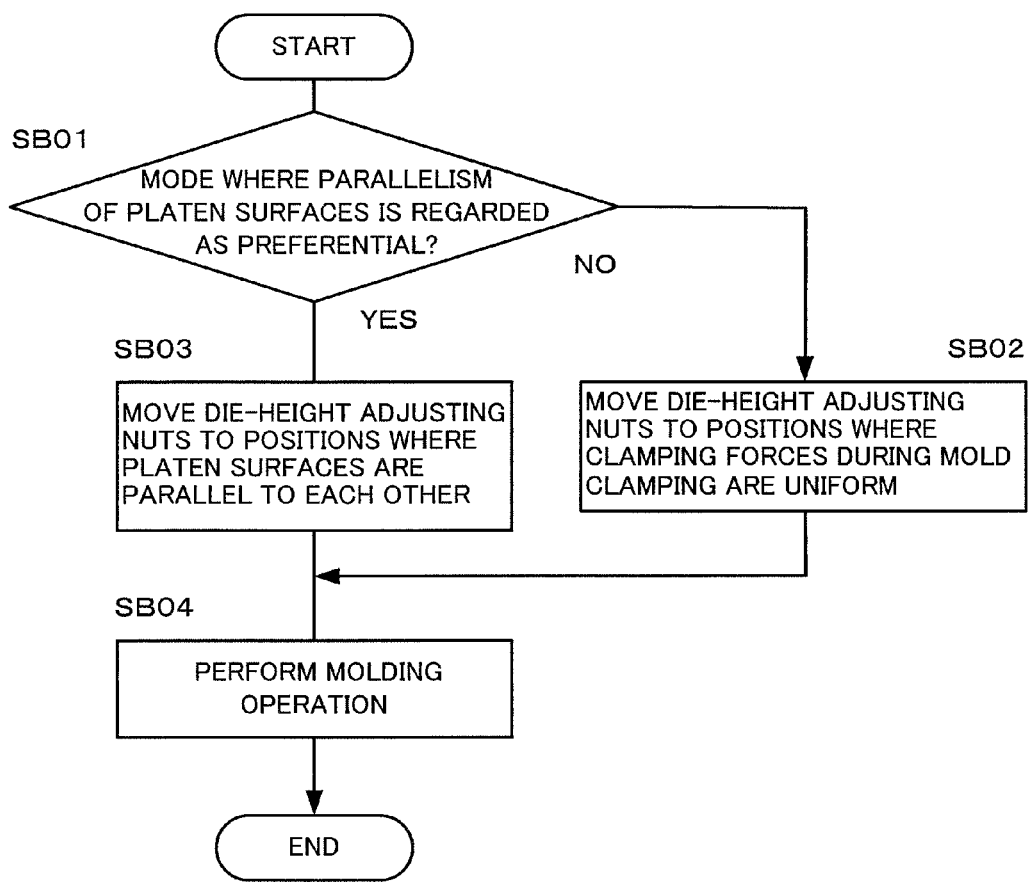
FIG. 5 is a flowchart illustrating a flow of processing in the second embodiment of the injection molding machine according to the present invention.

FIG. 5 is a flowchart illustrating a flow of processing in the second embodiment of the injection molding machine according to the present invention. The following is a sequential description of various steps of operation.

[Step SB01] It is determined whether or not the mode where the parallelism of the movable and stationary platen surfaces is regarded as preferential is selected. If the mode where the parallelism is regarded as preferential is selected (YES), the program proceeds to Step SB03. If not (NO), the program proceeds to Step SB02.

[Step SB02] The die-height adjusting nuts are moved to the positions where the clamping forces during mold clamping are uniform.

[Step SB03] The die-height adjusting nuts are moved to the positions where the platen surfaces are parallel.

[Step SB04] Molding operation is performed, and this processing ends the moment the molding operation ends.

The following is a description of tie-bar balance (effective length) adjustments in Steps SA01, SA03 and SA07 of the flowchart of FIG. 4 and Steps SB02 and SB03 of the flowchart of FIG. 5.

The drive of the die-height adjusting nuts 21 to 24 is controlled by the motors M1 to M4 based on the rotation commands from the die-height controller 40, whereupon the positions of the positions (rotational positions) of the adjusting nuts 21 to 24 move. Further, position data to be previously stored for the die-height adjusting nuts 21 to 24 are loaded into a storage device attached to the die-height controller 40.

For example, position data of the die-height adjusting nuts 21 to 24 are individually stored for the case where they are adjusted so that the clamping forces produced by the tie-bars during mold clamping are equal and the case where the adjusting nuts are adjusted so that the movable and stationary platen surfaces of the movable and stationary platens 5 and 2 are parallel to each other.

Just before mold closing during the molding operation, the respective positions of the die-height adjusting nuts 21 to 24 are moved based on the previously stored position data so that the movable and stationary platen surfaces are parallel to each other, whereupon the mold surfaces are brought into close contact with each other (which implies a change of the tie-bar balance during the mold closing in the molding cycle).

Then, the respective positions of the die-height adjusting nuts 21 to 24 are moved based on the previously stored position data so that the clamping forces produced by the tie-bars 11 to 14 during mold clamping are equal with the mold surfaces kept in close contact, whereupon the mold clamping is achieved (which implies a change of the tie-bar balance during the mold clamping in the molding cycle).

After a series of molding cycle processes, including the injection, dwelling, and metering processes, is performed to form a molded article in the mold assembly, clamping of the mold is released with the mold surfaces kept in close contact.

Just before the mold assembly is opened, the die-height adjusting nuts 21 to 24 are moved to the positions where the movable and stationary platen surfaces are parallel to each other, based on the previously stored position data of the die-height adjusting nuts, with the mold surfaces kept in close contact, and thereafter, mold opening is performed (which implies a change of the tie-bar balance during the mold opening in the molding cycle).

When the mold assembly is opened in this manner, the positions of the die-height adjusting nuts where the movable and stationary platen surfaces are parallel to each other and the positions of the die-height adjusting nuts where the clamping forces produced by the tie-bars during mold clamping are equal to one anther may be stored in advance so that the die-height adjusting nuts can be controlled to be located in the stored positions.

When this is done, the backlash states of the die-height adjusting nuts and a mold clamping mechanism may possibly vary depending on the operating state, mold closing or opening. Therefore, the positions of the die-height adjusting nuts 21 to 24 where the movable and stationary platen surfaces of the movable and stationary platens 5 and 2 are parallel to each other may possibly vary depending on the operating state, mold closing or opening. Thus, the die-height adjusting nuts 21 to 24 may be configured to move to previously stored positions for the mold closing and opening operations where the movable and stationary platen surfaces are parallel to each other.

Data on the die-height adjusting nuts 21 to 24 to be previously stored in the storage device attached to the die-height controller 40 may be data (output data of the rotational position detectors of the motors) on the amounts of relative movement between the positions of the die-height adjusting nuts 21 to 24 where the movable and stationary platen surfaces of the movable and stationary platens 5 and 2 are parallel to each other and where the clamping forces during mold clamping are uniform.

In this case, moreover, the backlash states of the die-height adjusting nuts and the mold clamping mechanism may possibly vary depending on the operating state, mold closing or opening. Therefore, the amounts of relative movement of the die-height adjusting nuts 21 to 24 from the positions where the platen surfaces are parallel to each other during mold closing to the positions where the clamping forces are uniform during mold clamping, from the positions where adjusting forces are uniform during mold clamping to the positions where the platen surfaces are parallel to each other during mold opening, and the amounts of relative movement of the die-height adjusting nuts 21 to 24 from the positions where the platen surfaces are parallel to each other during mold opening to the positions where the platen surfaces are parallel to each other during mold closing may be individually stored in advance.

The following is a description of an embodiment in which the parallelism of the movable and stationary platen surfaces of the movable and stationary platens 5 and 2 is measured by a sensor and the movement of the die-height adjusting nuts 21 to 24 are controlled in movement based on the results of the measurement.

A parallelism detection section may be provided to measure the parallelism of the mold surfaces or of the movable and stationary platen surfaces. By means of this detection section, the respective positions of the die-height adjusting nuts can be adjusted so that the movable and stationary platen surfaces are parallel to each other before the mold surfaces are brought into close contact with each other.

For example, a tilt sensor for measuring the tilt of the movable platen 5 relative to the stationary platen 2 may be attached, as the parallelism detector 41, to the movable platen 5 such that the respective positions of the die-height adjusting nuts 21 to 24 can be controlled based on data on the tilt angle of the movable platen 5 relative to the stationary platen 2 obtained by the tilt sensor. Alternatively, at least two distance detectors may be provided to detect the distance between the movable and stationary platen surfaces of the movable and stationary platens 5 and 2 at two locations. In this case, the parallelism of the movable and stationary platen surfaces can be detected based on values of the distance detected by these distance detectors, or the respective positions of the die-height adjusting nuts can be only adjusted so that the values of the distance between the platen surfaces detected by the detectors are equal. Further, the distance detectors may be mounted so that they can measure the distance between the mold surfaces in place of the distance between the movable and stationary platen surfaces.

According to this embodiment, the position data of the die-height adjusting nuts 21 to 24 for the parallelism of the movable and stationary platen surfaces of the movable and stationary platens 5 and 2 need not be previously stored in the storage device of the die-height controller 40.

Further, at least two clamping force detectors may be provided to detect the clamping forces produced by the tie-bars 11 to 14. In this case, the respective positions of the die-height adjusting nuts 21 to 24 can be adjusted so that the clamping forces detected by the clamping force detectors are equal during mold clamping. As shown in FIG. 1, the clamping force detector 42 is secured to the tie-bar 13 so that a signal indicative of the detected clamping force can be input to the die-height controller 40. The other clamping force detectors are not shown in FIG. 1.

A clamping force detected by a specific one of two or more clamping force detection sections may be regarded as a master clamping force such that the respective positions of the die-height adjusting nuts can be adjusted so that clamping forces detected by the other detection sections are equal to the master clamping force. Alternatively, the positions of the die-height adjusting nuts may be adjusted so that clamping forces detected by all the detection sections are equal to a predetermined clamping force.

According to this embodiment, the position data of the die-height adjusting nuts 21 to 24 for the uniformity of the clamping forces during mold clamping need not be previously stored in the storage device of the die-height controller 40.

According to another embodiment, a parallelism detection section may be provided to measure the parallelism of the mold surfaces, and at least two clamping force detection sections to detect the clamping forces produced by the tie-bars 11 to 14. In this case, the respective positions of the die-height adjusting nuts 21 to 24 can be adjusted so that the movable and stationary platen surfaces are parallel to each other before the mold surfaces are brought into close contact with each other, and so that the clamping forces detected by the clamping force detection sections are equal during mold clamping.

Arbitrary points in time during a period from just before the start of the mold closing process until the close contact between the mold surfaces, during a period from the release of mold clamping in the mold opening process until the start of the next mold closing process in the case of a continuous cycle, or before starting the molding cycle may be chosen to perform the operation to move the die-height adjusting nuts 21 to 24 to the previously stored positions where the movable and stationary platen surfaces of the movable and stationary platens 5 and 2 are parallel to each other and the operation to adjust the respective positions of the die-height adjusting nuts so that the parallelism of the movable and stationary platen surfaces detected by the parallelism detection section is obtained.

In the description of the present invention, "the clamping forces are equal" involves "the differences of the clamping forces are within an allowable range", in addition to "the clamping forces are completely equal". Depending on the properties of the mold clamping device and the mold assembly, moreover, it is sometimes more desirable to achieve a predetermined balance than to equalize the clamping forces produced by the tie-bars. In such cases, the die-height adjusting nuts may be adjusted to achieve a desired clamping force balance. The desired clamping force balance represents a state in which the clamping forces produced by the tie-bars have a desired ratio.

Depending on the properties of the mold clamping device and the mold assembly, furthermore, it is sometimes more desirable to adjust the movable and stationary platen surfaces of the movable and stationary platens so that they are tilted at a predetermined angle to each other than to adjust them so that they are parallel to each other. In such cases, the die-height adjusting nuts may be adjusted so that the movable and stationary platen surfaces maintain a desired parallelism. The desired parallelism is a positional relationship between the movable and stationary platen surfaces and can be designated by, for example, normal vectors of the two platen surfaces. Further, the amounts of die-height adjustment of the die-height adjusting nuts may be individually designated instead of designating the angle between the platen surfaces. If distance detectors are used as parallelism detectors, values therein may be detected individually. The desired clamping force balance and parallelism may be previously stored depending on the properties of the mold clamping device or set depending on the properties of the mold assembly.

In adjusting the die height based on the mold thickness and set clamping force, the die-height adjusting nuts should only be driven so that their amounts of movement are equal, as in the conventional case.

The invention claimed is:

1. An injection molding machine, comprising:
a rear platen;
a stationary platen; and
a die-height adjustment system, comprising:
    a plurality of tie-bars;
    a plurality of die-height adjusting nuts, wherein
        an end portion of each of the tie-bars has an external thread threadedly engaged with a corresponding one of the die-height adjusting nuts,
        the die-height adjusting nuts are rotatably attached to four corners of the rear platen, and
        the die-height adjusting nuts are also axially immovably attached to the four corners of the rear platen; and
    a die-height controller programmed to adjust a clearance between the stationary platen and the rear platen by rotating the die-height adjusting nuts to change effective lengths of tie-bars, wherein
at least two of the die-height adjusting nuts are rotatable independently of each other under control of the die-height controller,
the die-height controller is programmed to independently change the effective lengths of the tie-bars,
the die-height controller is programmed to rotate the die-height adjusting nuts
    to a position where a movable platen surface and a stationary platen surface maintain a parallelism, before mold closing and after release of mold clamping, and
    to a position where a clamping force produced by each of the tie-bars during mold clamping is in a balance, between said mold closing and said release of mold clamping.
the injection molding machine further comprising:
a storage unit in which positions of the die-height adjusting nuts at which the movable and stationary platen surfaces maintain the parallelism and positions of the die-height adjusting nuts at which the clamping force produced by each of the tie-bars during mold clamping is in the balance are stored in advance, wherein
the die-height controller is programmed to move the die-height adjusting nuts to the positions stored in the storage unit.

2. An injection molding machine, comprising:
a rear platen;
a stationary platen; and
a die-height adjustment system, comprising:
    a plurality of tie-bars;
    a plurality of die-height adjusting nuts, wherein
        an end portion of each of the tie-bars has an external thread threadedly engaged with a corresponding one of the die-height adjusting nuts, the die-height adjusting nuts are rotatably attached to four corners of the rear platen, and the die-height adjusting nuts are also axially immovably attached to the four corners of the rear platen; and a die-height controller programmed to adjust a clearance between the stationary platen and the rear platen by rotating the die-height adjusting nuts to change effective lengths of tie-bars, wherein at least two of the die-height adjusting nuts are rotatable independently of each other under control of the die-height controller, the die-height controller is programmed to independently change the effective lengths of the tie-bars, the die-height controller is programmed to rotate the die-height adjusting nuts to a position where a movable platen surface and a stationary platen surface maintain a parallelism, before mold closing and after release of mold clamping, and to a position where a clamping force produced by each of the tie-bars during mold clamping is in a balance, between said mold closing and said release of mold clamping, the injection molding machine further comprising:

a storage unit in which positions of the die-height adjusting nuts at which the clamping force produced by each of the tie-bars during mold clamping is in the balance are stored in advance; and a parallelism detector for detecting (i) parallelism of the movable and stationary platen surfaces or (ii) parallelism of a movable mold surface and a stationary mold surface, wherein the die-height controller is programmed to rotate the die-height adjusting nuts based on the parallelism detected by the parallelism detector so that the movable and stationary platen surfaces maintain the parallelism, and move the die-height adjusting nuts to the positions stored in the storage unit so that the clamping force produced by each of the tie-bars during mold clamping is in the balance.

3. An injection molding machine, comprising:

a rear platen;

a stationary platen; and a die-height adjustment system, comprising:

a plurality of tie-bars;

a plurality of die-height adjusting nuts, wherein an end portion of each of the tie-bars has an external thread threadedly engaged with a corresponding one of the die-height adjusting nuts, the die-height adjusting nuts are rotatably attached to four corners of the rear platen, and the die-height adjusting nuts are also axially immovably attached to the four corners of the rear platen; and a die-height controller programmed to adjust a clearance between the stationary platen and the rear platen by rotating the die-height adjusting nuts to change effective lengths of tie-bars, wherein at least two of the die-height adjusting nuts are rotatable independently of each other under control of the die-height controller, the die-height controller is programmed to independently change the effective lengths of the tie-bars, the die-height controller is programmed to rotate the die-height adjusting nuts to a position where a movable platen surface and a stationary platen surface maintain a parallelism, before mold closing and after release of mold clamping, and to a position where a clamping force produced by each of the tie-bars during mold clamping is in a balance, between said mold closing and said release of mold clamping, and in a single molding cycle between (a) the mold closing and (b) mold opening for removal of a molded article, the die-height controller is programmed to rotate the die-height adjusting nuts to achieve both (i) the parallelism of the movable and stationary platen surfaces and (ii) the balance of the clamping force produced by each of the tie-bars.

* * * * *